US006746034B2

(12) United States Patent
Fowles

(10) Patent No.: US 6,746,034 B2
(45) Date of Patent: Jun. 8, 2004

(54) WHEELCHAIR

(76) Inventor: Robert Michael Fowles, 77 Mowbray Road, Bedford, Bedfordshire (GB), MK42 9UX (*) Notice: Subject to any disclaimer, the term of this patent is extended or adjusted under 35 U.S.C. 154(b) by 0 days.

(21) Appl. No.: 10/230,664

(22) Filed: Aug. 29, 2002

(65) Prior Publication Data

US 2003/0057673 A1 Mar. 27, 2003

(30) Foreign Application Priority Data

Aug. 31, 2001 (GB) .......................................... 0121104

(51) Int. Cl.$^{7}$ .......................................... B62M 1/00
(52) U.S. Cl. ........................ 280/252; 280/253; 280/244
(58) Field of Search ............................ 280/647, 250.1, 280/252, 253, 243, 244, 246, 257, 264

(56) References Cited

U.S. PATENT DOCUMENTS

| | | | | | |
|---|---|---|---|---|---|
| 4,453,729 | A | * | 6/1984 | Lucken | 280/250.1 |
| 4,762,332 | A | | 8/1988 | Seol | |
| 5,007,655 | A | | 4/1991 | Hanna | |
| 5,020,815 | A | * | 6/1991 | Harris et al. | 280/246 |
| 5,509,673 | A | | 4/1996 | Wu et al. | |
| 5,683,321 | A | | 11/1997 | Barnett | |
| 5,846,154 | A | * | 12/1998 | Godin | 475/331 |
| 5,941,547 | A | | 8/1999 | Drake | |
| 6,007,082 | A | * | 12/1999 | Watwood et al. | 280/244 |
| 6,158,757 | A | * | 12/2000 | Tidcomb | 280/250.1 |
| 6,173,986 | B1 | | 1/2001 | Sicher | |
| 6,234,504 | B1 | * | 5/2001 | Taylor | 280/250.1 |
| 6,371,502 | B1 | * | 4/2002 | Howlett et al. | 280/304.1 |
| 6,450,518 | B1 | * | 9/2002 | Howard | 280/246 |

FOREIGN PATENT DOCUMENTS

| | | | |
|---|---|---|---|
| EP | 0 069 932 | A2 | 1/1983 |
| EP | 0 463 651 | A1 | 1/1992 |
| FR | 2 427 091 | | 12/1979 |
| GB | 2 303 594 | A | 2/1997 |
| GB | 2 308 342 | A | 6/1997 |
| GB | 2 335 402 | A | 9/1999 |
| GB | 2 339 177 | A | 1/2000 |

* cited by examiner

*Primary Examiner*—Lesley D. Morris
*Assistant Examiner*—Tony Winner
(74) *Attorney, Agent, or Firm*—Fay, Sharpe, Fagan, Minnich & McKee, LLP

(57) ABSTRACT

A wheelchair is disclosed that comprises a drive system that includes typically two input members carried for oscillatory movement on a frame of the wheelchair. A transmission is system disposed to mechanically interconnect each input member to a respective main ground-engaging wheel of the wheelchair. The transmission system is configured such that oscillatory movement of the input member causes rotational movement of the wheel, thereby enabling a user of the wheelchair to propel it by applying effort to the input member. Independent movement of the two input members can be used to effect steering control of the wheelchair. The wheelchair preferably also has a braking system to resist movement of the main wheels.

38 Claims, 7 Drawing Sheets

WHEELCHAIR

This invention relates to wheelchairs. Specifically, it has application to wheelchairs that can be employed to provide mobility for a person who is unable, or who has limited ability, to walk.

The most common design of wheelchair is propelled by a user using his or her hands to apply a turning force to rings secured to each of two main wheels of the wheelchair. However, it is well-recognised that this arrangement is not without its disadvantages. Conventional wheelchairs convert a user's efforts into motion with relatively low mechanical efficiency, not least because a user can apply force to the wheel in relatively short and discrete pulses. After time, a user's hands may be damaged by the efforts they are required to make. The action that a user must perform is not easy, particularly for those people who have limited use of their hands. Moreover, it is not pleasant for a user to have to directly handle wheels that are in such close contact with what is often a dirty environment. These disadvantages encourage users to adopt wheelchairs that are electrically propelled. However, this deprives the user of physical exercise, which they may be unable to obtain in other ways, and is not available to all people due to expense.

An aim of this invention is to provide a wheelchair and a drive system for a wheelchair that is more efficient and more amenable to its user.

From a first aspect, this invention provides a wheelchair comprising a drive system that includes an input member carried for oscillatory movement on a frame of the wheelchair, and a transmission system disposed to mechanically interconnect the input member to a ground-engaging wheel carried for rotation on the frame, the transmission system being configured such that oscillatory movement of the input member causes rotational movement of the wheel, thereby enabling a user of the wheelchair to propel it by applying effort to the input member.

It has been found that the required oscillatory movement can readily be applied by a user to the input member to cause drive to be applied to the wheel over a comparatively large proportion of its rotation. This can be achieved by a user making contact with the input member and without requiring the user to make direct contact with the wheel (or any component directly attached to the wheel).

A typical wheelchair embodying the invention includes two (or more) ground-engaging wheels. In such embodiments, there is typically provided a respective transmission system for each of the wheels. Preferably, each transmission system is connected to a respective input member, the input members being configured such that they may be moved by a user independently, or at least partially independently, of each other, whereby a user can selectively cause one or other of the wheels to be driven. In this way, the user can effect steering control.

The input member is most typically mounted for oscillatory movement along a linear path. For example, it may be a substantially rectilinear path. The path may be in a direction that has a substantial component in a direction of normal forward motion of the wheelchair. In such a configuration, the user operates the input members with a fore-and-aft pushing movement. In embodiments that include two input members, they may be disposed for motion along paths that are approximately symmetrical about a central axis of the wheelchair.

The transmission system may include a first drive gear that is caused to be driven by movement of the input member. For example, the input member may be connected to the first drive gear by a flexible connecting element such as a chain or a cable. The first gear may be in mesh with a wheel gear. Drive may be transmitted to the wheel by a wheel gear, in which case the wheel gear and the wheel are typically secured for rotation together in a first direction. The wheel gear and the ground-engaging wheel may be free to rotate with respect to one another in a second direction, such that the wheelchair can freewheel in a forward direction. For example, the wheel gear and the wheel may be interconnected through an overrunning clutch.

In an advantageously compact arrangement, the transmission system is incorporated into a hub unit of a ground-engaging wheel.

The extent to which the ground-engaging wheel turns upon each movement of the input member (referred to as the "drive ratio" in this specification) can be determined by relative sizes of components of the transmission system. The drive ratio is selected so as to avoid the need for the user to move the input member excessively rapidly in order to make satisfactory progress. At the same time, the drive ratio must be such as to ensure that the user need not apply excessive force in order to move the wheelchair. Advantageously, the transmission system is configured such that the drive ratio can be selected in order to meet the requirements of a specific user. The transmission system may furthermore be configured such that the drive ratio can be varied by the user while the wheelchair is in use.

A wheelchair embodying the invention most advantageously further comprises a braking system. The braking system may be incorporated into a housing in common with the transmission system.

Advantageously, the drive system may be readily applied and removed from a wheelchair. In such embodiments, the wheelchair may be propelled in a conventional manner when the drive system is not applied to the wheelchair.

An embodiment of the invention will now be described in detail, by way of example, and with reference to the accompanying drawings, in which.

Figure 1:
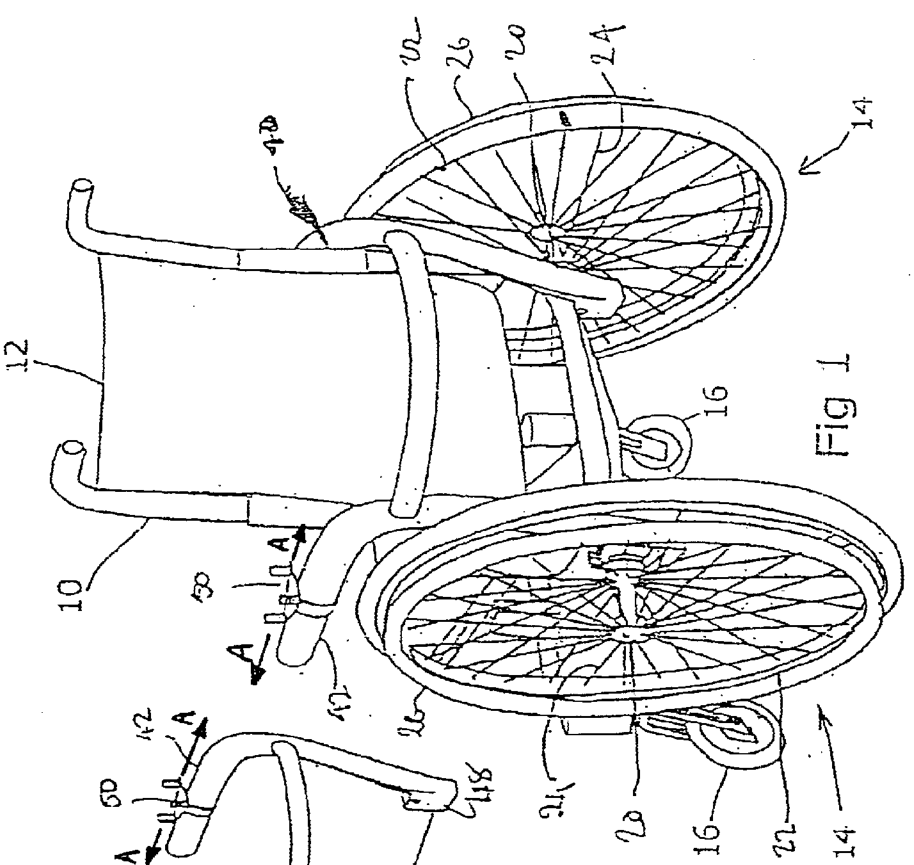
FIG. 1 is a rear view of a wheelchair embodying the invention.
Figure 2:
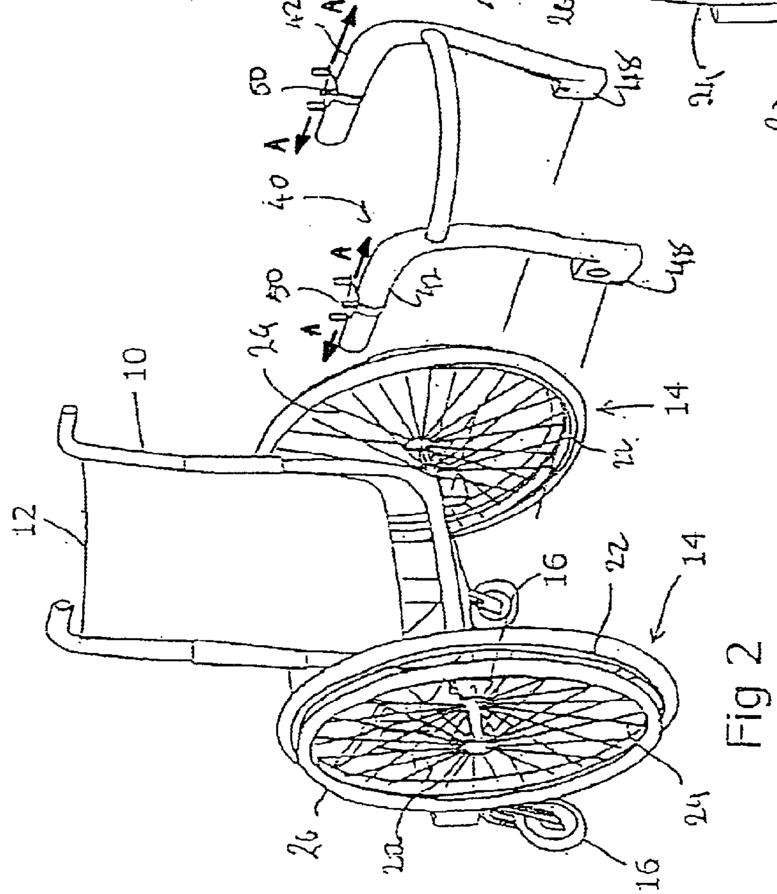
FIG. 2 is a part-exploded view similar to that of FIG. 1.
Figure 4:
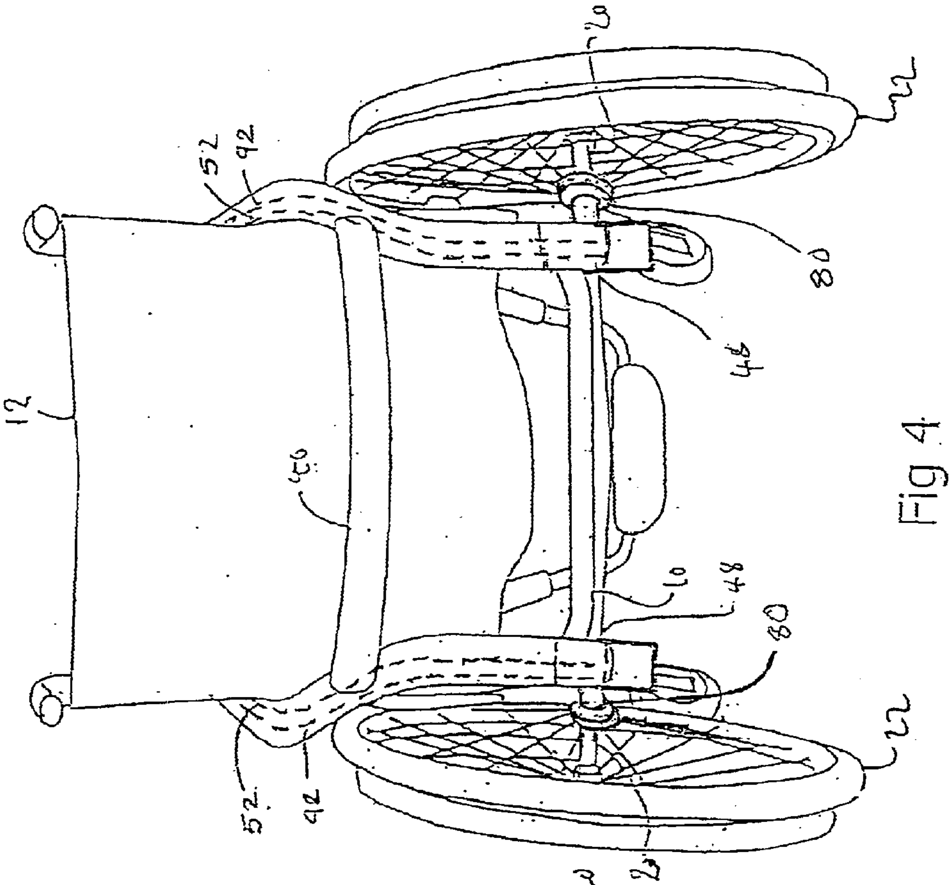
FIG. 4 is a view similar to that of FIG. 3 with the yoke in place.
Figure 3:
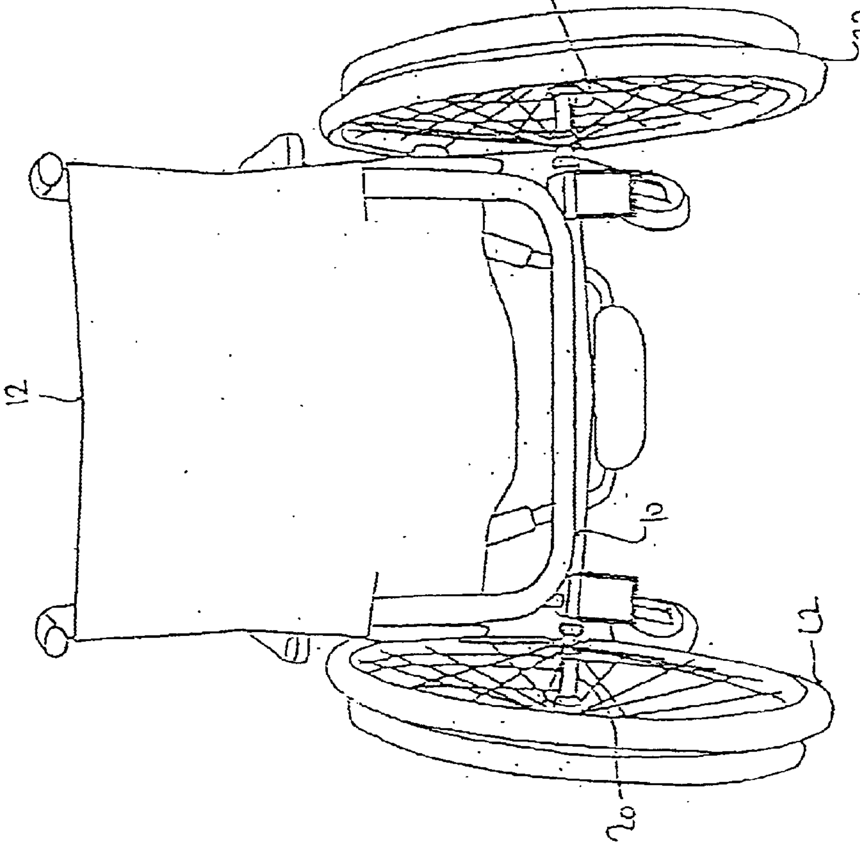
FIG. 3 shows the wheelchair of FIG. 1 with yoke being part of a drive system removed.

With reference first to FIG. 1, a wheelchair being a first embodiment of the invention is constructed around a frame 10, for example, of tubular steel, aluminium alloy, carbon fibre, and so forth. A seat is formed of flexible (e.g. fabric) elements 12 carried on the frame.

Four ground-engaging wheels are carried on the frame 10. Two of these are main wheels 14 and two are auxiliary wheels 16. The main wheels 14 are carried towards the rear of the frame and the auxiliary wheels 16 are carried towards the front. The diameter of each main wheel 14 is substantially greater than the diameter of each auxiliary wheel 16.

Each auxiliary wheel 16 has a generally solid construction. They are carried for rotation about an axis that is generally horizontal when the wheelchair is in use such that the wheel can roll over ground upon which the wheelchair is supported. Additionally, they can rotate about a generally vertical axis, in order that the wheel can turn to accommodate steering movement.

Each of the main wheels 14 is of spoked construction comprising a hub 20, and a rim and tyre 22 interconnected by a plurality of spokes 24. (This is just one form of construction amongst many possibilities.) The hub 20 is carried for rotation by a bearing 30 that is supported in a bearing housing 32 (this being described in greater detail below). The bearing 30 is configured such that the two main wheels 14 can rotate about a common axis that is generally horizontal when the wheelchair is in use, thereby allowing the wheels to roll over ground upon which the wheelchair is supported. Each of the main wheels 14 also carries a ring 26 centred upon the axis of rotation, and having a diameter less than that of the rim 22. A user sitting in the wheelchair can drive it forward by manual application of force to one or both rings 26.

Thus far, what has been described is a substantially conventional wheelchair. The particular construction described does not limit the scope of the invention. As will be appreciated, there are many other forms of construction that might be used for the frame, the seat and the wheels. It should also be noted that the provision of the rings 26 is not essential to implementation of the invention.

In addition to the conventional features described above, this embodiment includes a drive system that a user can operate to drive the wheelchair forward in addition or in the alternative to the rings 26.

This propulsion system includes a yoke 40. The yoke 40 is formed as of tubular metal, formed to be generally symmetrical about a fore-and-aft axis of the wheelchair. The yoke 40 comprises two arm portions 42 interconnected by a bridging portion 44.

Each arm portion 42 is shaped generally as an inverted 'L'. At a lower end region of each arm portion 42, there is hub housing 48 within which is serves to mount the arm on the frame 10. The arm portion 42 extends upwardly from the hub housing .48, and curves forward, such that an upper region of each arm portion extends to a respective side of the seat. The bridging portion 46 extends transversely between the arm portions 42 to the rear of the seat.

Each arm portion 42, on its upper region, carries an input drive handle 50 that constitutes an input member of the drive system. The particular configuration of the drive handle 50 is selected to be most appropriate for the abilities of a specific user of the wheelchair. In the example illustrated in the figures, the drive handle has wrist and finger supporting pegs suitable for use by a person that has limited hand function. A drive handle intended for use by a person that has full hand function might be configured quite differently.

Each drive handle 50 is mounted on the respective arm portion 42 such that it can slide along it between forward and rearward limits as indicated by the arrows A. Within the arm, the drive handle 50 is connected to a drive cable 52, which extends within the arm to the hub housing 48. The drive cable 52 is therefore caused to move within the arm as the drive handle 50 is moved along the arm portion 42.

Figure 10:
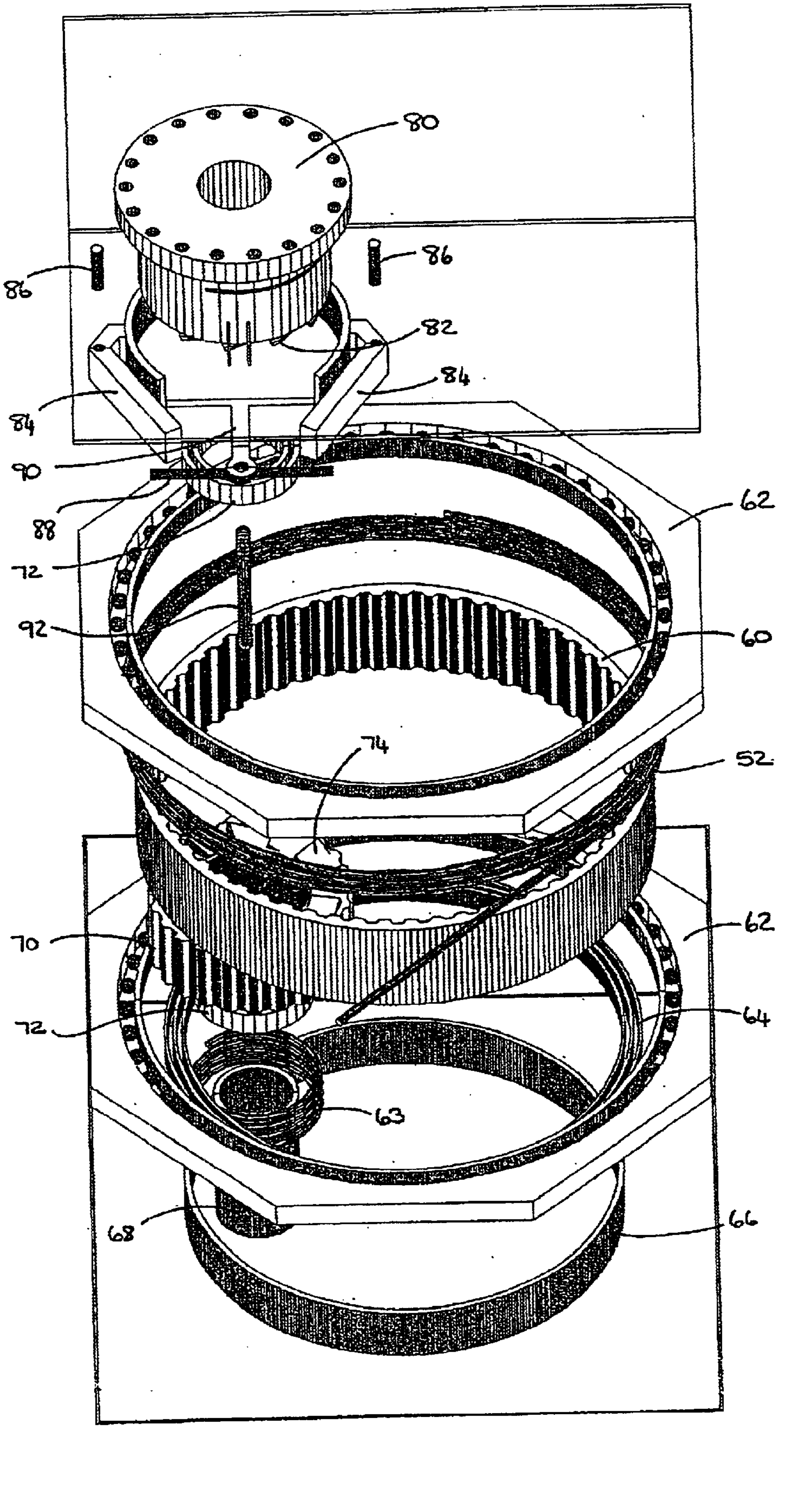
FIG. 10 is an exploded sectional view of a hub containing a transmission system and a brake of the wheelchair of FIG. 1.
Figure 11:
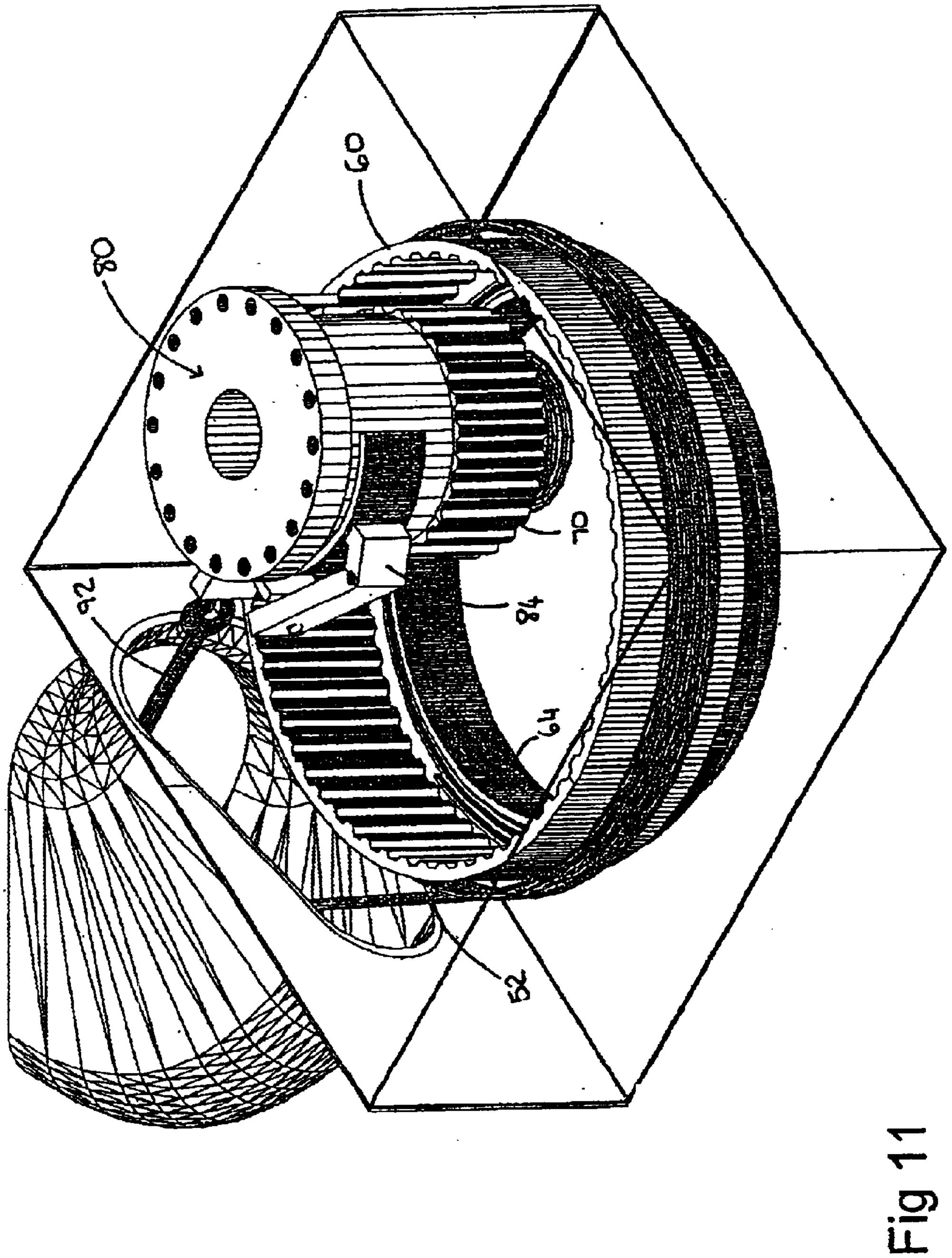
FIGS. 11 and 12 are more detailed views of component assemblies within the hub of FIG. 10.
Figure 12:
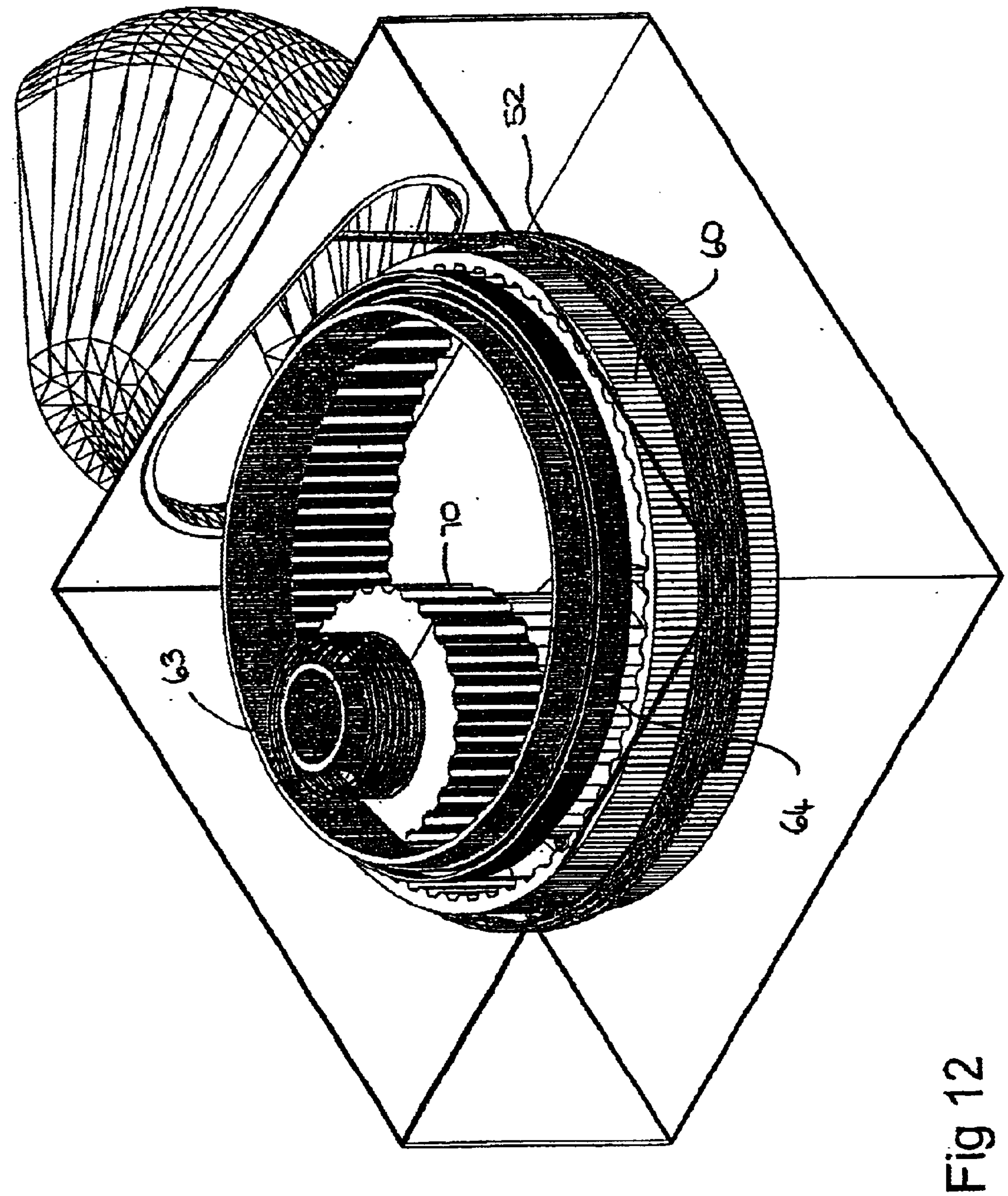

A transmission system is disposed within the hub housing 48 to convert movement of the drive cable 52 to rotational movement of the associated main wheel 14. The hub and its components are shown in FIGS. 10 to 12.

The transmission system includes an annular drive gear 60 that has a smooth cylindrical outer surface and a toothed inner surface. The drive gear 60 is carried for rotation within the hub housing 48 by rolling element bearings 62, such that the drive gear 60 can slide axially within the housing to a limited extent. A helical compression gear spring 63 urges the drive gear 60 in an axial direction towards the wheel gear 70 (as will be described below). A length of the drive cable 52 is coiled about the outer surface of the drive gear 60, with an end portion of the cable 52 being secured to the drive gear. A helical torsion hub spring 64 is secured towards one of its ends to spring guide 66 projecting into the hub housing, and is secured towards its opposite end to the drive gear 60.

The transmission system further comprises a wheel gear 70 carried for rotation on bearings 72 on a spigot 68 that projects within the hub housing 48. The wheel gear 70 has external teeth that mesh with the teeth of the drive gear 60. The wheel gear 70 further includes drive formations 74 to be described further below.

When the drive cable is pulled from its neutral position by movement of the drive handle 50, it is unwound from the drive gear 60, causing the drive gear 60 to rotate. This, in turn, causes the wheel gear 70 to rotate at a speed greater than the speed of the drive gear 60. This also causes the hub spring 64 to be placed into tension. When the drive handle 50 is subsequently released, the drive gear is caused to rotate in the opposite direction by the hub spring 64, causing the cable, once again, to wind onto the drive gear 60. The meshing gear teeth of the drive gear 60 and the wheel gear 70 may be formed helically so as to urge the drive gear into engagement with the wheel gear as the cable is unwound.

A drive body 80 is carried on the main wheel 14. The drive body comprises a flange that engages with the spokes of the main wheel 14 in order that rotation of the drive body causes the wheel 14 to rotate. The drive body 80 further comprises a spigot that projects into the hub housing 48 when the wheel is mounted for use on the hub housing 48. The spigot has a cylindrical outer surface and an end surface that carries drive formations 82 that cooperate with the drive formations of the wheel gear 70. The gear spring 63 ensures that the drive formations of the wheel gear 70 engage positively with those of the spigot when the cable is pulled, while allowing them to disengage when the cable is released. The drive formations are configured to operate as an over-running clutch such that drive is transmitted from the wheel gear 70 to the drive body 80 as the drive cable 52 is pulled from the hub housing 48, while the wheel gear 70 can turn freely as the cable is rewound under the action of the hub spring 64. Thus, repeated oscillatory movement of the drive handle 50 is converted into unidirectional motion of the main wheel 14. The number of turns made by the main wheel 14 for each movement of the drive handle 50 (the drive ratio) is determined by the length of travel of the drive handle, the outer diameter of the drive gear 70, and the ratio of the number of teeth of the drive gear 60 and the wheel gear 70.

Use of a drive that operates through a cable allows for a greater degree of flexibility than conventional systems. In particular, the position of the drive handle 50 can readily be positioned to suit a particular user. While this example has been described as being for operation by a user's hands, alternative configurations may be more appropriate for some users (for example, for operation by a user's leg, foot, elbow, or so forth).

A brake assembly is disposed within the hub housing 48 to act upon the cylindrical outer surface of the drive body 80. The brake assembly includes first and second brake shoes 84 each mounted on a respective pivot pin 86 within the hub housing 48. Each brake shoe 84 has a friction surface that closely surrounds the spigot of the drive body 80. An elastic brake operating cord 88 is connected to each of the brake shoes 84 remote from the pivot pin 86, the cord passing through a brake operating plate 90, the operating plate 90 being slidably mounted within the hub housing 48. A brake cable 92 is connected to the operating plate 90, from which it extends through the yoke to the respective arm portion 42. At the arm portion 42, the brake cable 92 is connected to a brake operating bar 96 that is slidably mounted on the arm portion 42.

When a user pushes the drive handle 50 in a direction opposite to that used to drive the chair forward, it slides to push a rod 94 into engagement with the braking bar 96, to move the braking bar 96 within the arm. The braking bar 96 is connected to the brake cable 92, to pull the brake cable that in turn pulls upon the brake operating plate 90. The brake cable 92 passes over a pulley 98 whereby it movement is caused to pass down the arm to the hub.

Through movement of the brake cable 92, the operating plate 90 is displaced within the hub housing 48, and this in turn places the brake operating cord 88 under tension, so pulling the brake shoes into frictional braking contact with the spigot of the drive body 80. Thus, movement of the associated main wheel 16, and therefore of the wheelchair, is resisted.

Figure 5:
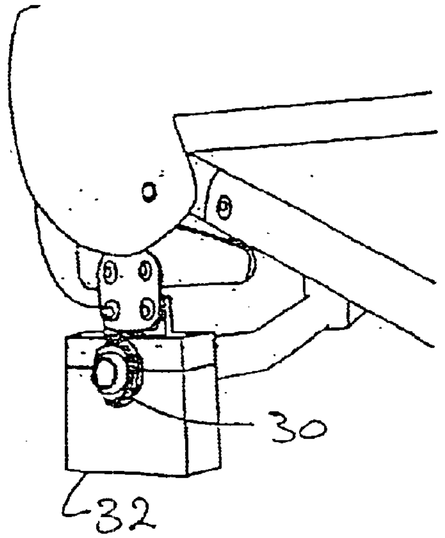
FIG. 5 is a view of a bearing housing of the wheelchair FIG. 1 showing its adaption for use in the present invention.
Figure 6:
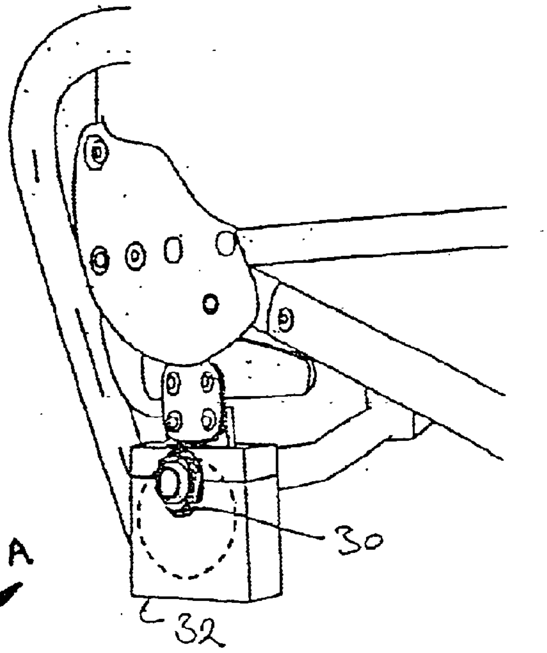
FIG. 6 is a view similar to that of FIG. 5 with the propulsion system of the invention in place.
Figure 7:
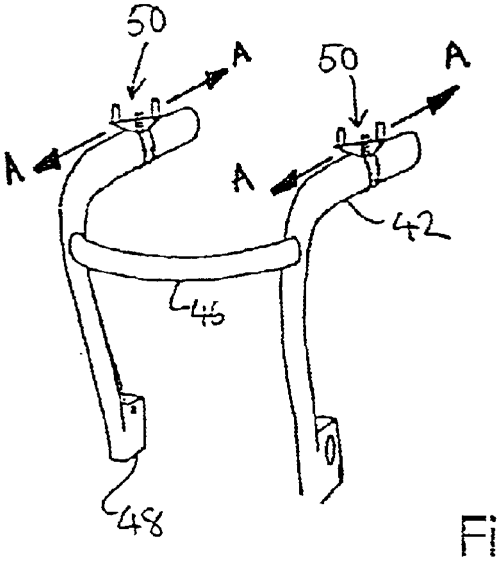
FIG. 7 shows the yoke of the wheelchair of FIG. 1.
Figure 8:
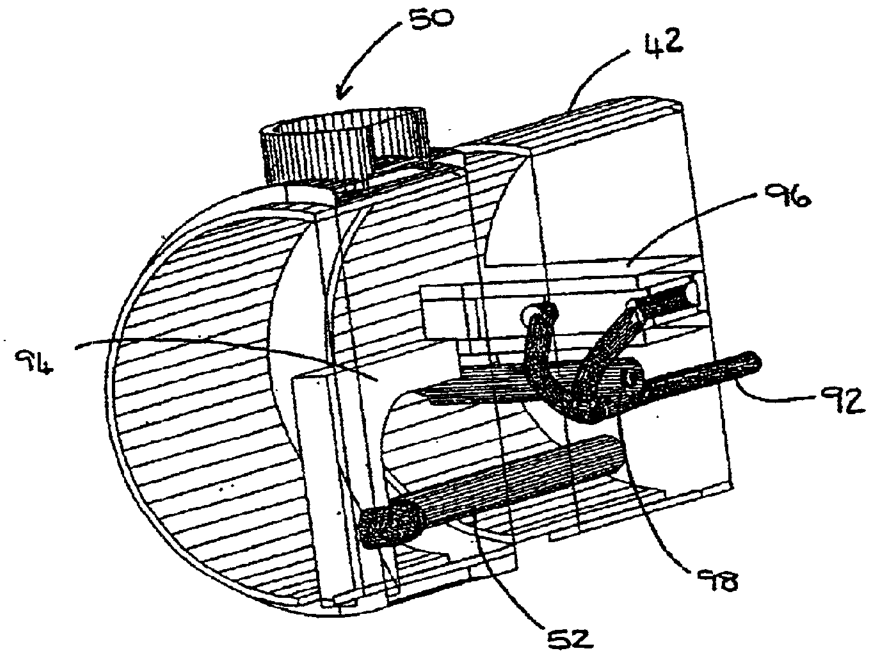
FIGS. 8 and 9 show an input member of a drive system of a wheelchair of FIG. 1.
Figure 9:
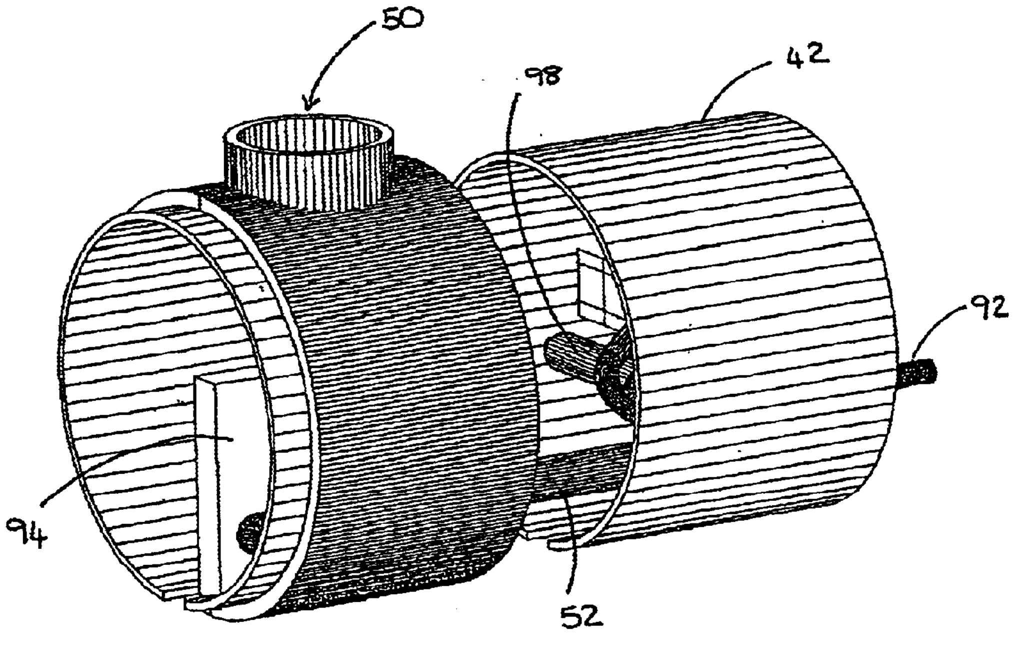

As shown in FIGS. 5 and 6, a hub unit of a wheelchair may require modification to enable a propulsion system to be mounted on it. This is as shown in FIG. 5. In this configuration, the wheelchair will still function completely as a manual wheelchair. When the propulsion system is installed, the wheelchair can be used as described above. In the case of a wheelchair equipped with quick release wheels the propulsion system can be quickly installed and removed. The position occupied by the hub gear when the propulsion systems is installed is shown as a dotted line in FIG. 6.

Therefore, the system may be added or removed at the user's will. For instance, about their home, it might be left off, because they will be travelling only over short distances. For use out of their house, the propulsion system may be quickly attached to assist more rapid progress over longer distances.

What is claimed is:

1. A drive system for a wheelchair that includes an input member arranged for oscillatory movement, and a transmission system configured to convert oscillatory movement of the input member to rotational movement of an output member, wherein the output member of the transmission system is arranged to engage with one of a ground-engaging wheel and an intermediate component connected to the ground-engaging wheel such that, in use, oscillatory movement of the input member causes rotational movement of the wheel, thereby enabling a user of the wheelchair to propel it by applying effort to the input member, wherein the input member is mounted for sliding oscillatory movement along a substantially rectilinear path.

2. A drive system according to claim 1 that includes a respective transmission system for each wheel to be driven.

3. A drive system according to claim 2 in which each transmission system is connected to a respective input member, the input members being configured such that they may be moved by a user independently of each other.

4. A drive system according to claim 1 in which the path is in a direction that has a substantial component in a v direction of normal forward motion of the wheelchair.

5. A drive system according to claim 4 including two input members disposed for motion along paths that are approximately symmetrical about a central axis of the wheelchair.

6. A drive system according to claim 1 in which the transmission system includes a first drive gear that is caused to be driven by movement of the input member.

7. A drive system according to claim 6 in which the input member is connected to the first drive gear by a flexible connecting element.

8. A drive system according to claim 6 in which the first drive gear is in mesh with a wheel gear.

9. A drive system according to claim 8 in which drive is arranged to be transmitted to the ground-engaging wheel by a wheel gear.

10. A drive system according to claim 9 in which the wheel gear is arranged to be secured for rotation to the ground-engaging wheel in a first direction.

11. A drive system according to claim 9 in which the wheel gear is arranged to rotate with respect to the ground-engaging wheel in a second direction.

12. A drive system according to claim 8 in which the wheel gear is arranged to be interconnected to the wheel through an overrunning clutch.

13. A drive system according to claim 1 in which the transmission system is configured such that the drive ratio, being the extent to which the ground-engaging wheel turns upon each movement of the input member, is configured such that the drive ratio can be selected in order to meet the requirements of a specific user.

14. A drive system according to claim 1 which further comprises a brake system.

15. A drive system according to claim 14 in which the brake system is incorporated into a housing in common with the transmission system.

16. A drive system according to claim 1 that is mounted on a yoke that is releasably attachable to the wheelchair.

17. A drive system according to claim 16 in which the wheelchair can be propelled in a conventional manner when the drive system is not applied to the wheelchair.

18. A drive system for a wheelchair that includes an input member arranged for oscillatory movement, and a transmission system configured to convert oscillatory movement of the input member to rotational movement of an output member, wherein the output member of the transmission system is arranged to engage with one of a ground-engaging wheel and an intermediate component connected to the ground-engaging wheel such that, in use, oscillatory movement of the input member causes rotational movement of the wheel, thereby enabling a user of the wheelchair to propel it by applying effort to the input member, wherein the transmission system includes a first drive gear that is caused to be driven by movement of the input member, a wheel gear that meshes with the first drive gear and, in use, causes the ground engaging wheel to rotate, and wherein the first dive gear is connected to the input member by a flexible connecting element.

19. A drive system according to claim 18 in which the wheel gear is arranged to be secured for rotation to the ground-engaging wheel in a first direction.

20. A drive system according to claim 18 in which the wheel gear is arranged to rotate with respect to the ground-engaging wheel in a second direction.

21. A drive system according to claim 18 in which the wheel gear is arranged to be interconnected to the wheel through an overrunning clutch.

22. A drive system according to claim 18 in which the input member is mounted for sliding oscillatory movement along a substantially rectilinear path.

23. A drive system according to claim 18 in which the transmission system is configured such that the drive ratio, being the extent to which the ground-engaging wheel turns upon each movement of the input member, is configured such that the drive ratio can be selected in order to meet the requirements of a specific user.

24. A drive system according to claim 18 which further comprises a brake system incorporated into a housing in common with the transmission system.

25. A drive system according to claim 18 in which the drive system is mounted on a yoke that is releasably attachable to the wheelchair.

26. A drive system for a wheelchair that includes an input member arranged for oscillatory movement, and a transmission system configured to convert oscillatory movement of the input member to rotational movement of an output member, wherein the output member of the transmission system is arranged to engage with one of a ground-engaging wheel and an intermediate component connected to the ground-engaging wheel such that, in use, oscillatory movement of the input member causes rotational movement of the wheel, thereby enabling a user of the wheelchair to propel it by applying effort to the input member, and further includes a brake system that is incorporated into a housing in common with the transmission system.

27. A drive system according to claim 26 in which the input member is mounted for sliding oscillatory movement along a linear path.

28. A drive system according to claim 27 in which the path is a substantially rectilinear path.

29. A drive system according to claim 28 in which the path is in a direction that has a substantial component in a direction of normal forward motion of the wheelchair.

30. A drive system according to claim 26 in which the transmission system includes a first drive gear that is caused to be driven by movement of the input member.

31. A drive system according to claim 30 in which the input member is connected to the first drive by a flexible connecting element.

32. A drive system according to claim 30 in which the first drive gear is in mesh with a wheel gear.

33. A drive system according to claim 32 in which drive is transmitted to the ground-engaging wheel by the wheel gear.

34. A drive system according to claim 33 in which the wheel gear is arranged to be secured for rotation to the ground-engaging wheel in a first direction.

35. A drive system according to claim 33 in which the wheel gear is arranged to rotate with respect to the ground-engaging wheel in a second direction.

36. A drive system according to claim 32 in which the wheel gear is arranged to be interconnected to the wheel through an overrunning clutch.

37. A drive system according to claim 26 in which the transmission system is configured such that the drive ratio, being the extent to which the ground-engaging wheel turns upon each movement of the input member, is configured such that the drive ratio can be selected in order to meet the requirements of a specific user.

38. A drive system according to claim 26 in which the drive system is mounted on a yoke that is releasably attached to the wheelchair.

* * * * *